US012661898B2

(12) United States Patent
Inomata

(10) Patent No.: US 12,661,898 B2
(45) Date of Patent: Jun. 23, 2026

(54) LIQUID STORAGE BODY AND LIQUID EJECTION APPARATUS

(71) Applicant: CANON KABUSHIKI KAISHA, Tokyo (JP)

(72) Inventor: Hiroshi Inomata, Kanagawa (JP)

(73) Assignee: CANON KABUSHIKI KAISHA

(*) Notice: Subject to any disclaimer, the term of this patent is extended or adjusted under 35 U.S.C. 154(b) by 114 days.

(21) Appl. No.: 18/582,420

(22) Filed: Feb. 20, 2024

(65) Prior Publication Data

US 2024/0359473 A1 Oct. 31, 2024

(30) Foreign Application Priority Data

Apr. 26, 2023 (JP) ................................ 2023-072354

(51) Int. Cl.
*B41J 2/175* (2006.01)

(52) U.S. Cl.
CPC .................................... *B41J 2/175* (2013.01)

(58) Field of Classification Search
CPC ............... B41J 2/17503; B41J 2/17506; B41J 2/17509; B41J 2/17513; B41J 2/1752; B41J 2/17523; B41J 2/17553; B41J 2/17556; B41J 2/20; B41J 2002/17516; B41J 29/13
See application file for complete search history.

(56) References Cited

U.S. PATENT DOCUMENTS

| | | | | |
|---|---|---|---|---|
| 7,311,761 | B2 * | 12/2007 | Ishizawa | B41J 2/17513 347/92 |
| 2017/0173966 | A1 * | 6/2017 | Kawate | B41J 2/17506 |
| 2018/0104955 | A1 | 4/2018 | Kawate et al. | B41J 2/17523 |
| 2019/0184710 | A1 * | 6/2019 | Nagashima | B41J 2/17553 |
| 2022/0379621 | A1 | 12/2022 | Inomata et al. | B41J 2/175 |
| 2023/0321991 | A1 | 10/2023 | Inomata et al. | B41J 2/175 |

FOREIGN PATENT DOCUMENTS

| | | |
|---|---|---|
| JP | 2018-065373 | 4/2018 |

* cited by examiner

*Primary Examiner* — Anh T Vo
(74) *Attorney, Agent, or Firm* — Venable LLP

(57) ABSTRACT

A liquid storage body for supplying liquid to a liquid ejection apparatus. The storage body includes a bag to store liquid containing a settleable component, a connection section to supply liquid stored in the bag to the liquid ejection apparatus through a supply port while attached to the liquid ejection apparatus, a flow path section inside the bag to supply liquid to the connection section, and an intake section inside the bag to take in liquid stored in the bag and to supply the liquid to the flow path section. The intake section includes first and second intake ports to take in liquid. The intake section is supported by the flow path section to rotate with the consumption of liquid stored inside the bag. The first and second intake ports face each other with a flow path formed therebetween in a defined direction.

20 Claims, 17 Drawing Sheets

LIQUID STORAGE BODY AND LIQUID EJECTION APPARATUS

CROSS REFERENCE TO PRIORITY APPLICATION

This application claims the benefit of Japanese Patent Application No. 2023-072354, filed Apr. 26, 2023, which is hereby incorporated by reference herein in its entirety.

BACKGROUND OF THE INVENTION

Field of the Disclosure

This disclosure relates to a liquid storage body and a liquid ejection apparatus.

Description of the Related Art

A liquid storage body for supplying liquid to a liquid spraying apparatus (also referred to as "liquid ejection apparatus") has been conventionally in wide use. In general, such a liquid storage body comprises a flexible bag. The bag may store therein liquid containing a settleable component such as a pigment. In this case, since the settleable component settles, the density of settleable component contained in the liquid is high at the bottom of the bag and low at the top of the bag.

Japanese Patent Laid-Open No. 2018-65373 discloses a liquid storage body comprising a spacer member having a first inlet for sucking liquid relatively low in settleable component density at the top of the bag and a second inlet for sucking liquid relatively high in settleable component density at the bottom of the bag. This liquid storage body also comprises a merge section that merges liquid sucked from the above two inlets together to make the density uniform.

In the liquid storage body disclosed in Japanese Patent Laid-Open No. 2018-65373, however, the spacer member has a certain height inside the bag. Accordingly, as the liquid inside the bag is consumed and the bag is gradually collapsed, the spacer member may obstruct the collapse of the bag and inhibit the liquid from being used up.

SUMMARY

Thus, this disclosure aims to provide a liquid storage body capable of suitably maintaining the density of settleable component contained in liquid and improving the ability to use up the liquid.

Means for Solving the Problem

The liquid storage body according to the present invention is a liquid storage body for supplying liquid to a liquid ejection apparatus, the liquid storage body includes a bag configured to store liquid containing a settleable component, a connection section configured to supply liquid stored in the bag to the liquid ejection apparatus through a supply port while being attached to the liquid ejection apparatus, a flow path section provided inside the bag and configured to supply liquid to the connection section, and an intake section provided inside the bag and configured to take in liquid stored in the bag and supply the liquid to the flow path section, wherein the intake section comprises a first intake port and a second intake port to take in liquid, the intake section is rotatably supported by the flow path section inside the bag, and the first intake port and the second intake port are formed to face each other with a flow path therebetween, the flow path being formed in a direction in which a rotation axis extends in a case where the intake section rotates.

Further features of the present disclosure will become apparent from the following description of exemplary embodiments with reference to the attached drawings.

DESCRIPTION OF THE EMBODIMENTS

First Embodiment

Figure 1:
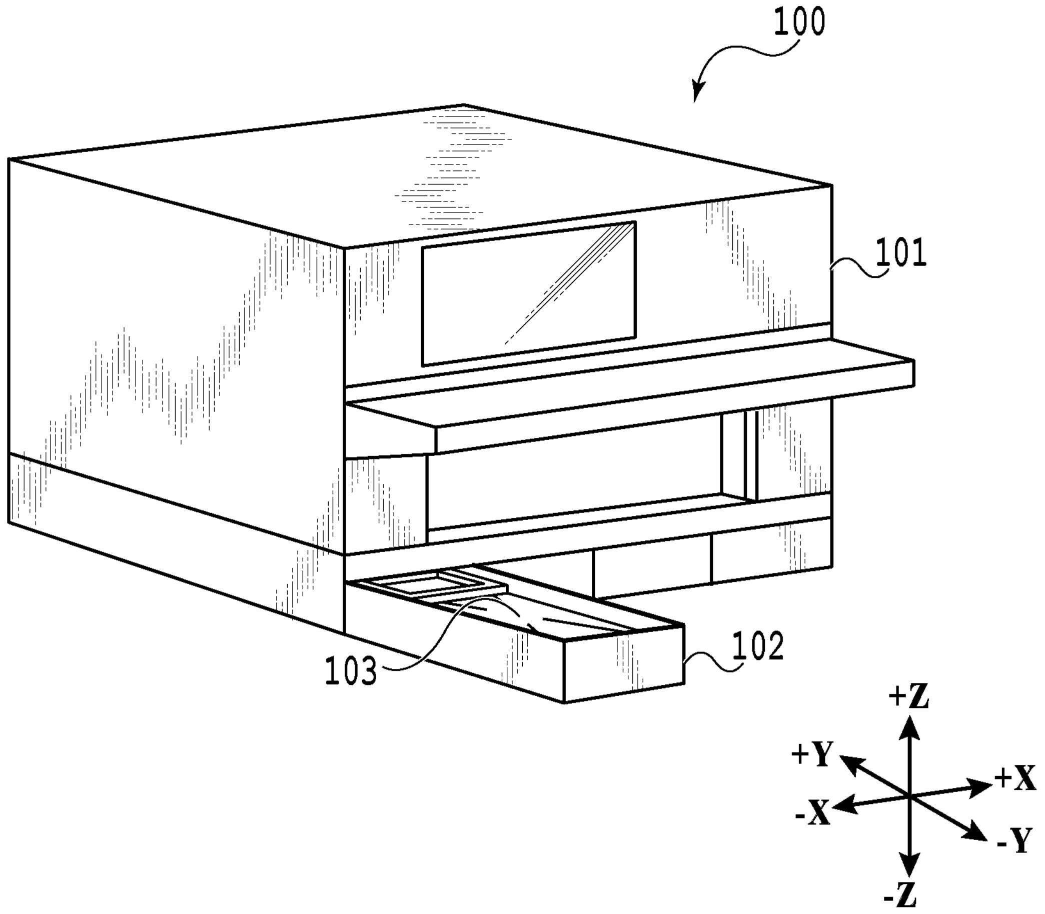
FIG. 1 is an external perspective view showing an example of a liquid ejection apparatus in an embodiment.

The present embodiment will be described below in detail with reference to the accompanying drawings. The same feature is denoted by the same reference numeral in all the drawings.

FIG. 1 is an external perspective view schematically showing a liquid ejection apparatus 100 in the present embodiment. First, the coordinate axes in the drawings will be explained. In the drawings referred to herein, an X direction and a Y direction indicate two directions orthogonal to each other in a horizontal plane. A Z direction indicates a vertical direction. −Y, +Y, −X, +X, +Z, and −Z directions indicate the front, back, left, right, top, and bottom of the liquid ejection apparatus 100, respectively. In the following description, the top, bottom, right, and left indicate directions in a posture of the liquid ejection apparatus 100 used in a normal state unless otherwise specified. In addition, the X, Y, and Z directions herein indicate width, length, and height directions of a liquid storage body 103, respectively.

The present embodiment assumes that liquid is ink, but the liquid is not limited to ink.

"Record" (also referred to as "print") is not limited to the meaning of forming significant information such as a character or graphics. "Record" also means formation of insignificant information. "Record" widely means formation of an image, design, pattern, structure, or the like, on a recording medium and processing of a medium regardless of whether a recorded matter is made apparent so that it is visible to a human.

"Recording medium" means not only a common recording sheet, but also any medium capable of accepting liquid such as cloth, plastic film, metal plate, glass, ceramic, resin, wood, and leather.

As shown in FIG. 1, the liquid ejection apparatus 100 (for example, a serial type inkjet printer) comprises a casing 101 that forms an outer shell of the liquid ejection apparatus 100 and a plurality of trays 102 detachably attached below the casing 101. The tray 102 can detachably store the liquid storage body 103 storing liquid. Incidentally, the tray 102 can be attached to and detached from the casing 101 singly even without storing the liquid storage body 103.

The casing 101 comprises therein an attaching/detaching section (described later) for detachably attaching the liquid storage body 103. The casing 101 also comprises therein a liquid ejection head capable of performing recording by ejecting liquid to a recording medium, and a negative pressure generating device capable of sucking liquid from the liquid storage body 103 and supplying the liquid to the liquid ejection head. An example of the negative pressure generating device is a suction pump.

The casing 101 also comprises therein a scan mechanism for reciprocally moving the liquid ejection head in scan directions (+X directions), a conveying mechanism for conveying a recording medium in a conveying direction (−Y direction), a control device for controlling operations of these devices, and a storage tray for a recording medium. The liquid ejection apparatus 100 can record an image by causing the conveying mechanism to move a recording medium intermittently in the conveying direction and causing the liquid ejection head to eject liquid while moving in the main scan directions together with the scan mechanism.

In this example, the liquid storage body 103 can be attached to the liquid ejection apparatus 100 by pushing the tray 102 in the +Y direction toward the liquid ejection apparatus 100 with the liquid storage body 103 stored in the tray 102. In contrast, in a case when the tray 102 is pulled in the −Y direction from the state where the liquid storage body 103 is attached to the liquid ejection apparatus 100, the liquid storage body 103 can be detached from the liquid ejection apparatus 100. That is, the liquid storage body 103 can be attached to and detached from the liquid ejection apparatus 100 by pushing the tray 102 storing the liquid storage body 103 toward the liquid ejection apparatus 100 and pulling it from the liquid ejection apparatus 100. In the following description, a posture of the liquid storage body 103 attached to the liquid ejection apparatus 100 will be referred to as an "attached posture." Since the liquid storage body 103 is attached to the liquid ejection apparatus 100 so that the height direction of the liquid storage body 103 corresponds to the vertical direction, the Z direction corresponds to the vertical direction in the attached posture.

To the liquid ejection apparatus 100 of the present embodiment, four liquid storage bodies 103 storing cyan (C), magenta (M), yellow (Y), and black (Bk) inks are attached. Incidentally, although the four liquid storage bodies 103 have the same capacity in this example, the capacity does not necessarily need to be the same. For example, the capacity of the liquid storage body storing the black ink, which is used at a high frequency, may be greater than those of the liquid storage bodies storing the other color inks. Ink colors usable in the present embodiment are not limited to these four colors. The ink colors may be three or less colors or five or more colors, including colors other than the above colors. The liquid ejection head comprises a plurality of ejection openings capable of ejecting liquid of each of the above four colors. As described above, the liquid ejection head of the present embodiment is capable of so-called full-color printing.

Liquid Storage Body 103

Figure 2A:
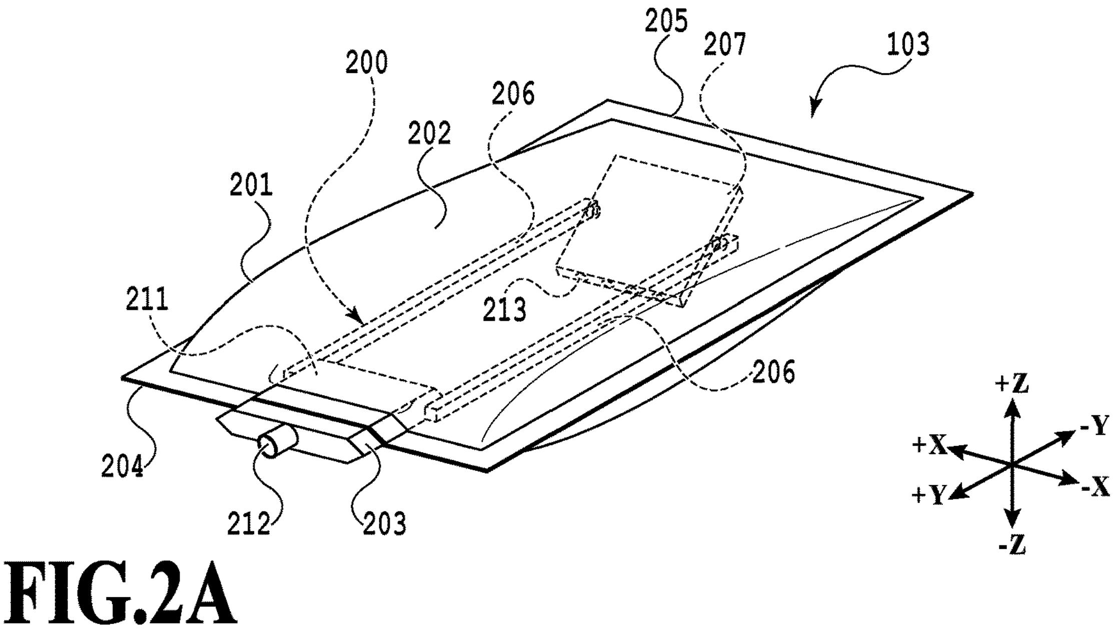
FIG. 2A is a diagram showing an example of a liquid storage body in an embodiment.
Figure 2B:
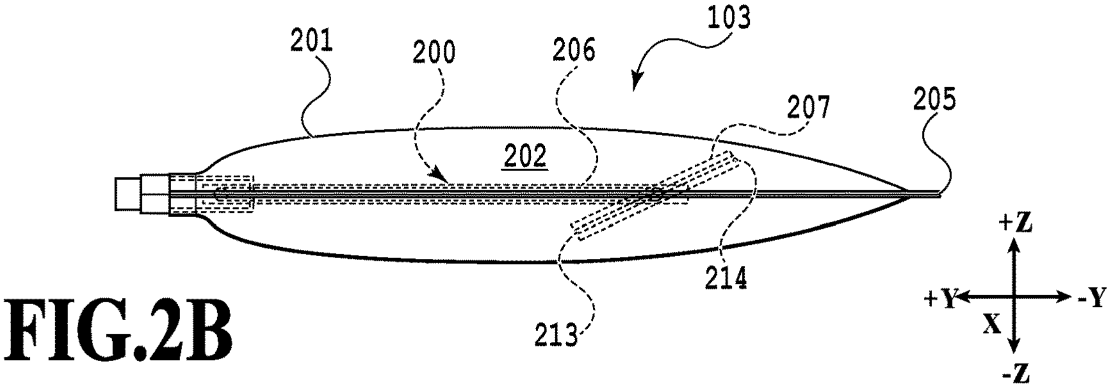
FIG. 2B is a transparent side view of the liquid storage body in the embodiment.
Figure 2C:
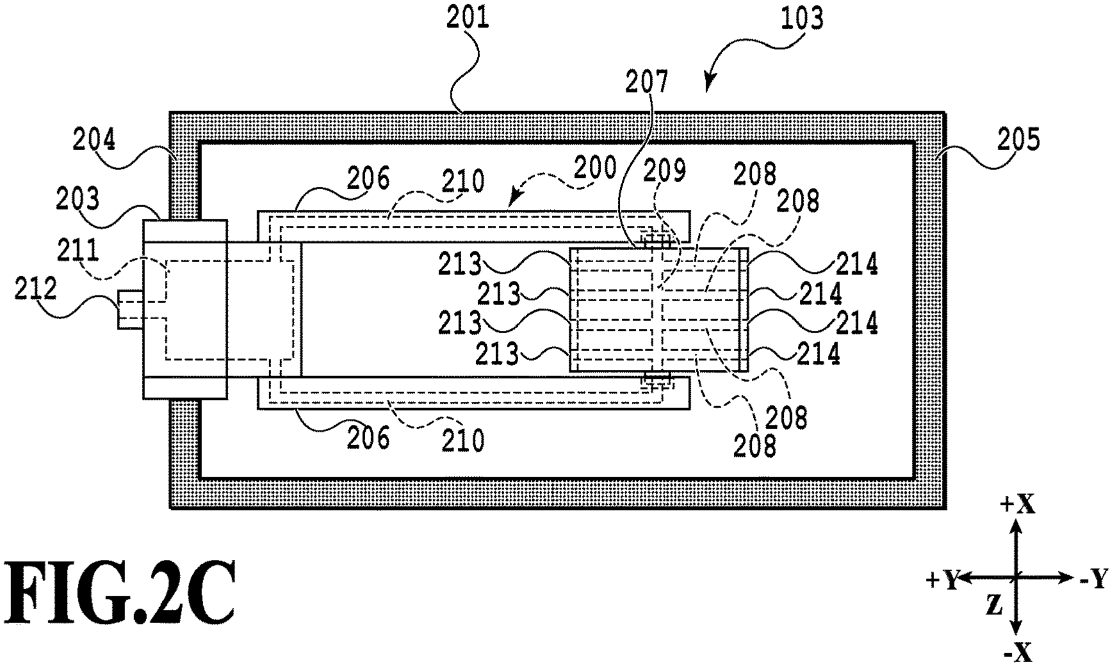
FIG. 2C is a transparent plan view of the liquid storage body in the embodiment.

FIG. 2A is a transparent perspective view showing an example of the liquid storage body 103 in the present embodiment. FIG. 2B is a transparent side view of the liquid storage body 103 in the present embodiment. FIG. 2C is a transparent plan view of the liquid storage body 103 in the present embodiment. Incidentally, the posture of the liquid storage body 103 shown in FIGS. 2A to 2C is the aforementioned attached posture.

As shown in FIG. 2A, the liquid storage body 103 comprises a flexible bag 201 and a liquid supply unit 200 for supplying liquid to the liquid ejection apparatus. The bag 201 comprises a liquid storage chamber 202 capable of storing liquid containing a settleable component, one end 204 extending in the transverse direction, and the other end 205 opposing the one end 204. In this example, the length of the bag 201 in the transverse direction (X direction) is 120 mm and the length of the bag 201 in the longitudinal direction (Y direction) is 220 mm. Dimensions of each part of the bag 201 can be variously selected as long as the bag can store the amount of liquid required by the liquid ejection apparatus 100. The bag 201 is formed by superimposing two rectangular films and connecting their edges to each other. In other words, the shape of the bag 201 in this example is of a so-called pillow type. The bag 201 may be in another form provided that the bag can store/hold liquid and is made of a flexible material that is collapsed flatly according to the use of liquid. The films of the bag 201 are each formed by laminating multiple layers. Examples of the layers forming the bag 201 include a polyester layer, an aluminum layer, a nylon layer, and a polyethylene layer. As a matter of course, a silica vapor deposition layer or ethylene vinyl alcohol (EVOH) copolymer resin layer may be formed and other materials or configurations may be adopted depending on the properties of liquid or required quality.

The liquid supply unit 200 includes a connection unit 203 fixed to the one end 204, a flow path section including a flow path member 206 fixed to the connection unit 203, and a rotor plate 207 rotatably supported by the flow path section and capable of functioning as an intake section. In this example, two flow path members 206 are provided as the flow path section.

The connection unit 203 can supply liquid stored in the liquid storage chamber 202 to the liquid ejection apparatus through a supply port 212 while being attached to the liquid ejection apparatus. The flow path members 206 have flow paths (not shown here) extending inside the liquid storage chamber 202 (inside the bag 201) and capable of guiding liquid. In the present embodiment, the rotor plate 207 is rotatably supported by the two flow path members 206. The rotor plate 207 is provided in the liquid storage chamber 202. The rotor plate 207 can take in liquid stored in the liquid storage chamber 202 and supply the liquid to the flow path members 206. The rotor plate 207 comprises a first intake port 213 capable of taking in liquid and a second intake port (not shown here) located at a height different from the height of the first intake port 213.

The connection unit 203 has a merge chamber 211 capable of merging liquid guided by the two flow path members 206. Incidentally, in the present embodiment, liquid taken in from the first intake port 213 and liquid taken in from the second intake port can be merged inside the rotor plate 207, which will be described later.

As shown in FIG. 2B, the rotor plate 207 has the first intake port 213 and the second intake port 214 for taking in liquid stored in the liquid storage chamber 202. While liquid is stored in the liquid storage chamber 202, the first intake port 213 is located vertically below the second intake port 214. While the liquid storage body 103 is attached to the liquid ejection apparatus and liquid is stored in the liquid storage chamber 202, the rotor plate 207 is inclined in advance a predetermined angle with the horizontally-extending flow path member 206. This is because, as will be described later in detail, the center of gravity of the rotor plate 207 is not located in a rotation axis of the rotor plate 207. In this example, the center of gravity of the rotor plate 207 is located between the rotation axis of the rotor plate 207 and one end of the rotor plate 207 (the end in which the first intake port 213 is formed).

As described above, the liquid storage chamber 202 stores in advance a predetermined amount of liquid containing a settleable component. In this example, it is assumed that the settleable component is a pigment. Other examples of the settleable component include a resin material and metal material.

In a case when the liquid storage body 103 is standing still at the same posture for a long period, the pigment settles under the influence of gravity. In this case, the pigment density of the liquid at the bottom of the liquid storage chamber 202 is higher than that at the top of the liquid storage chamber 202. That is, the pigment density of the liquid is uneven in the liquid storage chamber 202.

At the time of a recording operation of the liquid ejection apparatus, the liquid stored in the liquid storage chamber 202 is sucked into and supplied to the liquid ejection apparatus by a negative pressure produced by the suction of the aforementioned negative pressure generating device. In this example, it is assumed that liquid relatively high in pigment density is taken in from the first intake port 213 located at a relatively-low position in the liquid storage chamber 202 and liquid relatively low in pigment density is taken in from the second intake port 214 located at a relatively-high position in the liquid storage chamber 202.

As shown in FIG. 2C, the liquid supply unit 200 comprises flow paths capable of guiding liquid from the rotor plate 207 to the connection unit 203. In the present embodiment, a first flow path 208 formed in the rotor plate 207 includes a flow path for guiding liquid taken in from the first intake port 213 to a second flow path 209 and a flow path for guiding liquid taken in from the second intake port 214 to the second flow path 209. In the second flow path 209, the liquid taken in from the first intake port 213 is merged with the liquid taken in from the second intake port 214.

The rotor plate 207 has the first flow path 208 penetrating the rotor plate 207 in the longitudinal direction (Y direction). In this example, four first flow paths 208 are formed. The number of first flow paths 208 is not limited to four and may be three or less or five or more. The first flow path 208 has the first intake port 213 and the second intake port 214. In this example, the first flow path 208 has a diameter of 1 mm. The diameter of the first flow path 208 is not limited to 1 mm and may be less than or greater than 1 mm. The rotor plate 207 has the second flow path 209 penetrating the rotor plate 207 in the transverse direction (X direction). The second flow path 209 intersects the first flow paths 208 in the center of the rotor plate 207 in the longitudinal direction (Y direction). In this example, a single second flow path 209 intersects four first flow paths 208 at right angles.

The first intake ports 213 and the second intake ports 214 are formed to face each other with the second flow path 209 therebetween, the second flow path 209 being formed along a direction (X direction, in this example) in which the rotation axis (described later) extends at the time of rotation of the rotor plate 207. Each of the two flow path members 206 has a third flow path 210 capable of connecting with the second flow path 209 while supporting the rotor plate 207.

The connection unit 203 has the merge chamber 211 in which the flows of liquid from the two third flow paths 210 are merged while one end of each of the two flow path members 206 is fixed and the supply port 212 for supplying liquid to the liquid ejection apparatus. Incidentally, the supply port 212 is sealed with a sealing member (such as packing described later). Thus, the liquid never flows out of the supply port 212 as long as the supply port 212 is sealed.

In the present embodiment, the flows of liquid taken in from the first intake port 213 and the second intake port 214, respectively, pass through the first flow path 208 and are then merged first in the second flow path 209. That is, in the present embodiment, the second flow path 209 also functions as the merge chamber. Accordingly, even in a case when there is a difference in pigment density between the liquid taken in from the first intake port 213 and the liquid taken in from the second intake port 214, the pigment density of the liquid is made uniform to some extent in the second flow path 209.

With the rotor plate 207 supported by the flow path members 206, the second flow path 209 is connected to the third flow paths 210. In this example, with the single rotor plate 207 supported by the two flow path members 206, one end of the second flow path 209 is connected to one third flow path 210 and the other end of the second flow path 209 is connected to the other third flow path 210. For example, with the single rotor plate 207 supported by the two flow path members 206, an end of the second flow path 209 in the +X direction is connected to one third flow path 210 and the other end of the second flow path 209 in the −X direction is connected to the other third flow path 210. As a result, liquid can be supplied from the second flow path 209 to the third flow paths 210. In this example, liquid is supplied so as to branch out from the single second flow path 209 into the two third flow paths 210.

The flow path members 206 and the connection unit 203 are connected to each other to supply liquid from the third flow paths 210 to the merge chamber 211. In this example, liquid is supplied so as to flow from each of the third flow paths 210 formed in the respective two flow path members 206 into the single merge chamber 211 formed in the single connection unit 203. As described above, in this example, the pigment density can be made uniform to some extent by merging the liquid first in the second flow path 209. After that, the pigment density of the liquid can be made more uniform by merging the liquid again in the merge chamber 211.

Rotor Plate 207

Figure 3:
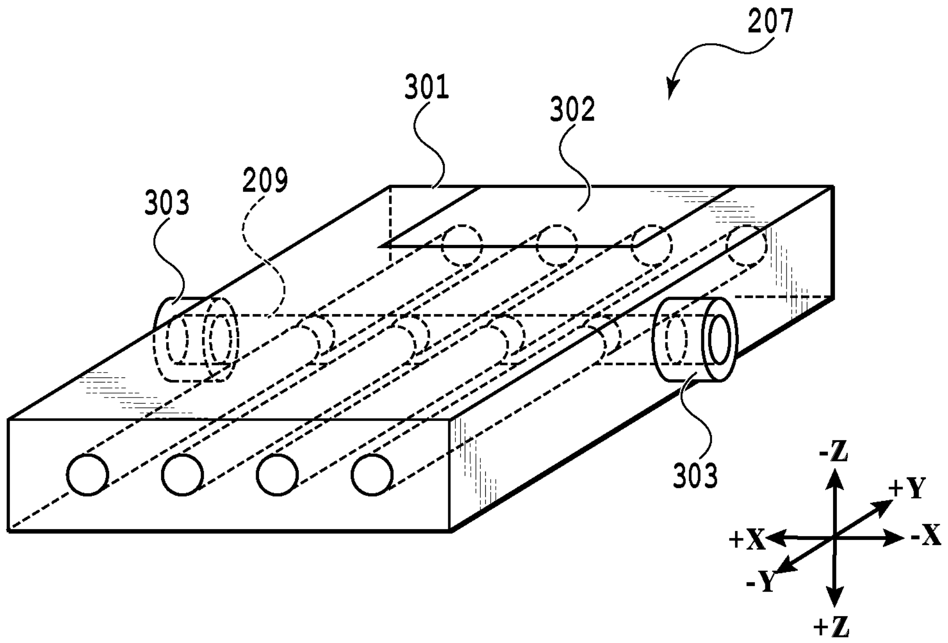
FIG. 3 is a transparent perspective view showing an example of a rotor plate in an embodiment.

FIG. 3 is a transparent perspective view showing an example of the rotor plate 207 applicable to the present embodiment. To facilitate understanding, FIG. 3 shows the rotor plate 207 turned upside down from the state of FIG. 2C.

As shown in FIG. 3, the rotor plate 207 comprises a main body 301 and a weight 302 provided at one end (end on the +Y direction side) of the main body 301. The main body 301 is made of resin (such as polyester or polypropylene). The weight 302 is made of a material higher in specific gravity than the resin forming the main body 301 (for example, metal such as stainless steel). Thus, the rigidity of the rotor plate 207 is higher than that of the bag made from films.

In the present embodiment, a columnar rotation shaft 303 is formed on each of the right and left side surfaces (surfaces oriented in the +X directions) of the main body 301. The rotation shaft 303 is formed in the center of the main body 301 in the longitudinal direction (Y direction). The rotor plate 207 can be rotated by fitting the rotation shafts 303 into fitting sections (first openings described later) formed in the flow path members. The second flow path 209 is formed to penetrate these two rotation shafts 303 in the transverse direction (X direction) of the main body 301. In other words, the second flow path 209 is also formed in the center of the rotor plate 207 in the longitudinal direction (Y direction).

According to this configuration, the center of gravity of the rotor plate 207 is located closer to one end of the main body 301 (+Y direction side) than the second flow path 209. That is, in a flat state without the weight 302, the center of gravity of the rotor plate 207 is located in the center of the main body 301 in the transverse direction (X direction) and the center (second flow path 209) in the longitudinal direction (Y direction). However, by providing one end of the main body 301 with the weight 302 made of the material higher in specific gravity than the main body 301, the center of gravity of the rotor plate 207 is shifted from the center (second flow path 209) in the longitudinal direction (Y direction) toward one end of the main body 301 (+Y direction). Accordingly, in a state in which liquid in the liquid storage chamber is not consumed, the rotor plate 207 can be on standby in a posture inclined in advance by the force applied by the weight 302.

Figure 4A:
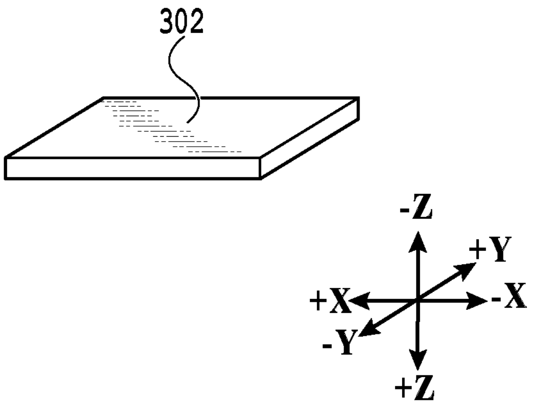
FIG. 4A is an external perspective view showing an example of a weight in the embodiment.
Figure 4B:
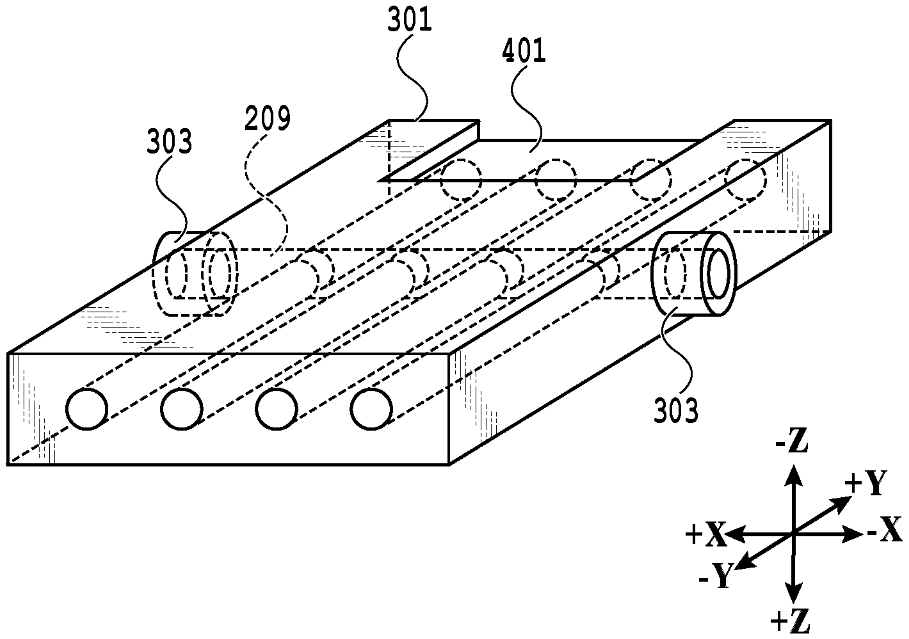
FIG. 4B is an external perspective view showing an example of a main body in the embodiment.

FIGS. 4A and 4B are diagrams showing an example of members forming the rotor plate in the present embodiment. FIG. 4A is an external perspective view showing an example of the weight 302 in the present embodiment. FIG. 4B is an external perspective view showing an example of the main body 301 in the present embodiment.

As shown in FIG. 4A, the weight 302 is a rectangular parallelepiped in the shape of a flat plate. The material, size, or shape of the weight 302 or combinations thereof may be appropriately determined as long as the rotor plate can be rotated from a posture inclined an angle with the flow path member.

As shown in FIG. 4B, one end of the main body 301 (end in the +Y direction in this example) has a fixing area 401 for fixing the weight 302 (see FIG. 4A). In this example, the weight 302 (see FIG. 4A) is bonded with an adhesive applied to the fixing area 401. Incidentally, the method of fixing the weight 302 is not limited to bonding with an adhesive as long as the weight 302 can be fixed to the fixing area 401. For example, the weight 302 may be welded to the fixing area 401.

Flow Path Member 206

Figure 5:
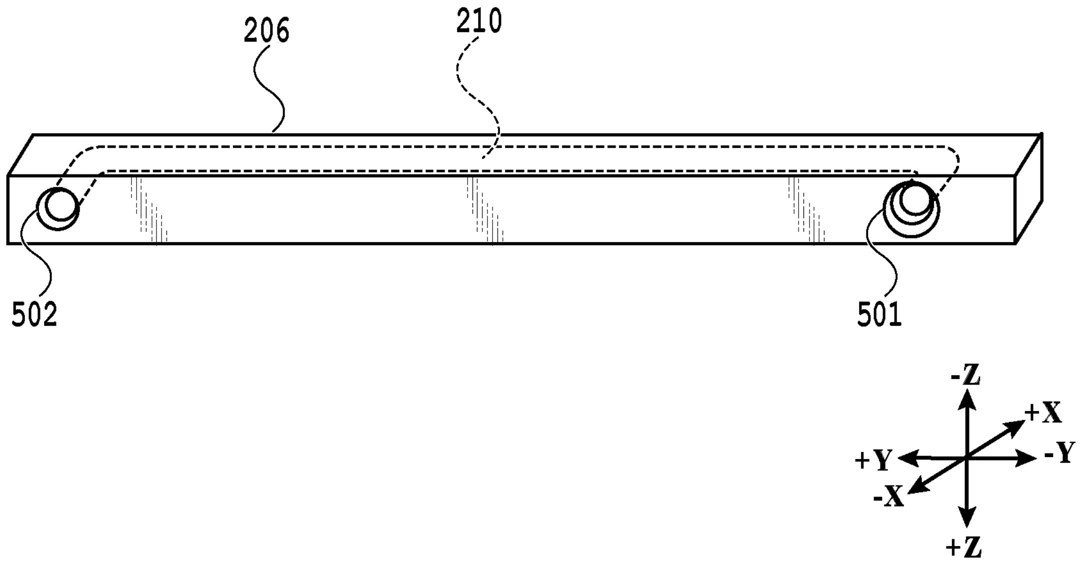
FIG. 5 is an external perspective view showing an example of a flow path member in an embodiment.

FIG. 5 is a perspective view showing an example of the flow path member 206 applicable to the present embodiment. Although two flow path members 206 are provided in the present embodiment as described above, FIG. 5 illustrates one flow path member 206 for the sake of explanation. Both of the two flow path members 206 used in the present embodiment have the same configuration.

As shown in FIG. 5, the flow path member 206 is made of resin (such as polyester or polypropylene). A first opening 501 having an inside diameter slightly larger than an outside diameter of the rotation shaft 303 (see FIG. 3) is formed at one end in the Y direction (end in the −Y direction in this example) of a side surface of the flow path member 206 (surface oriented in the −X direction in this example). On the other hand, a second opening 502 for supplying liquid to the connection unit is formed at the other end in the Y direction (end in the +Y direction in this example) of the side surface of the flow path member 206 (surface oriented in the −X direction in this example). Further, the third flow path 210 for guiding liquid from the first opening 501 to the second opening 502 is formed inside the flow path member 206.

The third flow path 210 is formed by forming a through hole penetrating the flow path member 206 and then filling a portion unnecessary for the flow path with a material having an outside diameter equal to an inside diameter of the through hole. By thus forming the third flow path 210, the rotation shaft 303 (see FIG. 3) can be rotatably fit into the first opening 501.

Connection Unit 203

Figure 6A:
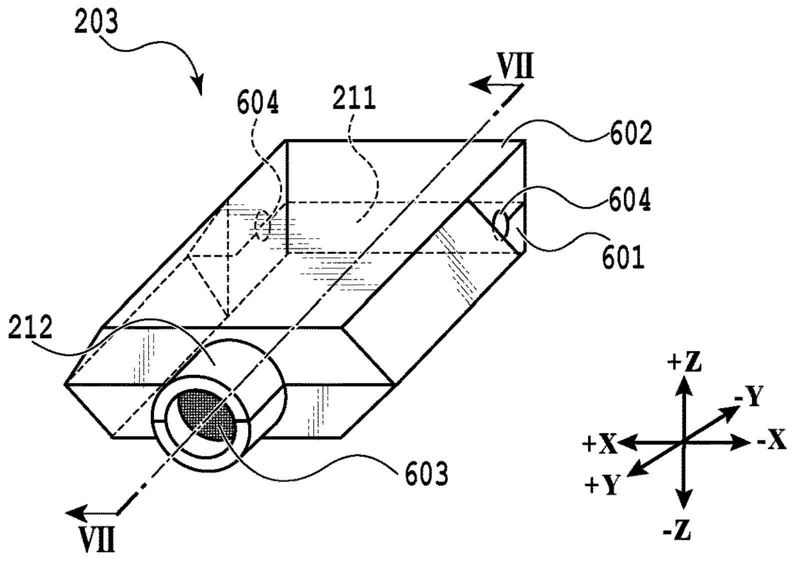
FIG. 6A is an external perspective view showing an example of a connection unit.
Figure 6B:
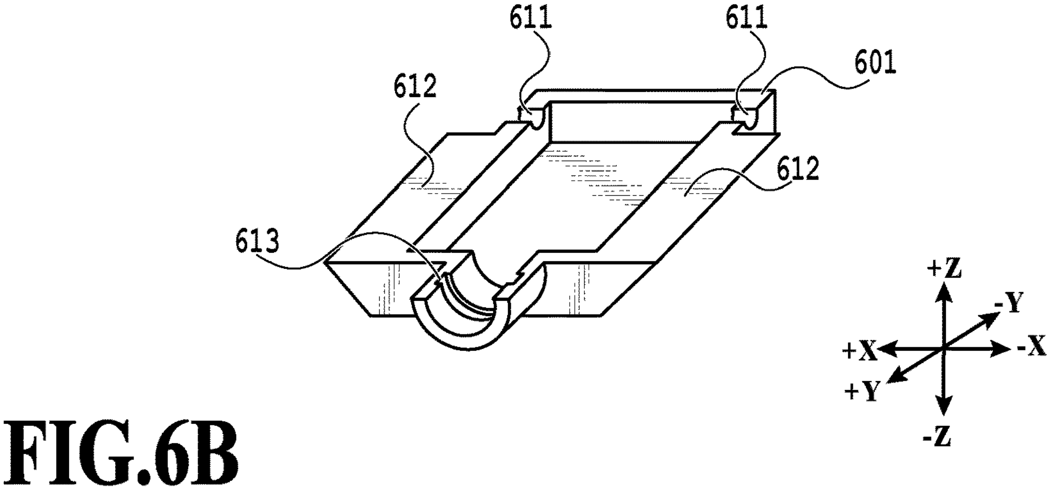
FIG. 6B is a perspective view showing an example of a first half body.
Figure 6C:
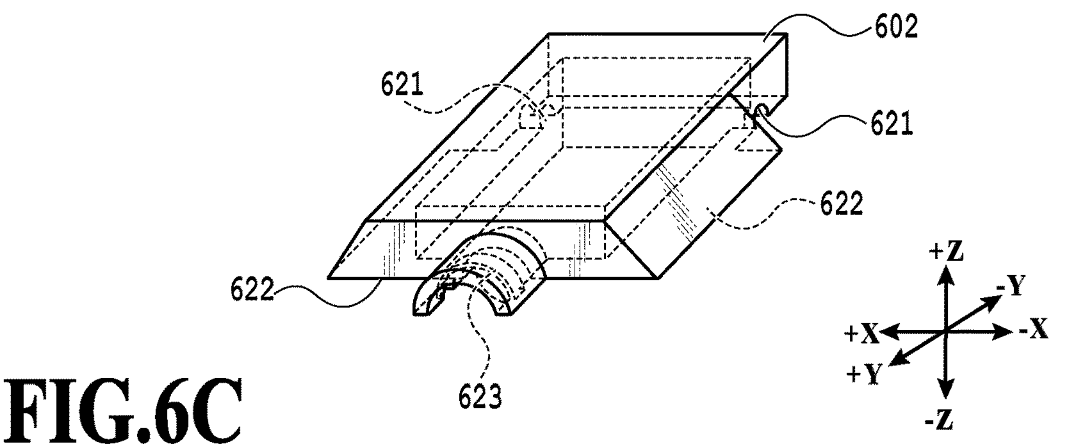
FIG. 6C is a perspective view showing an example of a second half body.

FIGS. 6A to 6C are diagrams for illustrating the connection unit 203 applicable to the present embodiment. FIG. 6A is an external perspective view showing an example of the connection unit 203. FIG. 6B is a perspective view showing an example of a first half body 601. FIG. 6C is a perspective view showing an example of a second half body 602.

As shown in FIG. 6A, the connection unit 203 comprises the first half body 601 and the second half body 602, which are the halves of the main body portion, and packing 603 for sealing the supply port 212. The packing 603 is made of an elastomer (such as rubber). One opening 604 is formed on a first side surface of the connection unit 203 (for example, the surface oriented in the −X direction). One opening 604 is formed on a second side surface of the connection unit 203 (for example, the surface oriented in the +X direction). In a case when liquid flows from the openings 604 into the connection unit 203, the flows of liquid are mixed with each other in the merge chamber 211 and the pigment density is made uniform.

As shown in FIG. 6B, the first half body 601 has a first recessed portion 611 forming the lower half of the opening 604 (see FIG. 6A), a first bonding surface 612 that can be bonded to the second half body, and a first groove 613 into which the lower end of the packing is fit. In this example, two first recessed portions 611 are formed in the respective side surfaces in the +X directions.

As shown in FIG. 6C, the second half body 602 has the same configuration as the first half body. That is, the connection unit 203 (see FIG. 6A) is manufactured by sandwiching the packing between the two members having the same configuration and bonding these two members together. The second half body 602 has a second recessed portion 621 forming the upper half of the opening 604 (see FIG. 6A), a second bonding surface 622 that can be bonded to the first bonding surface 612 (see FIG. 6B), and a second groove 623 into which the upper end of the packing is fit. In this example, two second recessed portions 621 are formed in the respective side surfaces in the +X directions.

In the manufacture of the connection unit 203 (see FIG. 6A), the first bonding surface 612 (see FIG. 6B) and the second bonding surface 622 are bonded together while the lower end of the packing is fit into the first groove 613 (see FIG. 6B) and the upper end of the packing is fit into the second groove 623. The first bonding surface 612 (see FIG. 6B) and the second bonding surface 622 may be connected by welding or may be bonded with an adhesive.

Attachment of Liquid Storage Body

Figure 7:
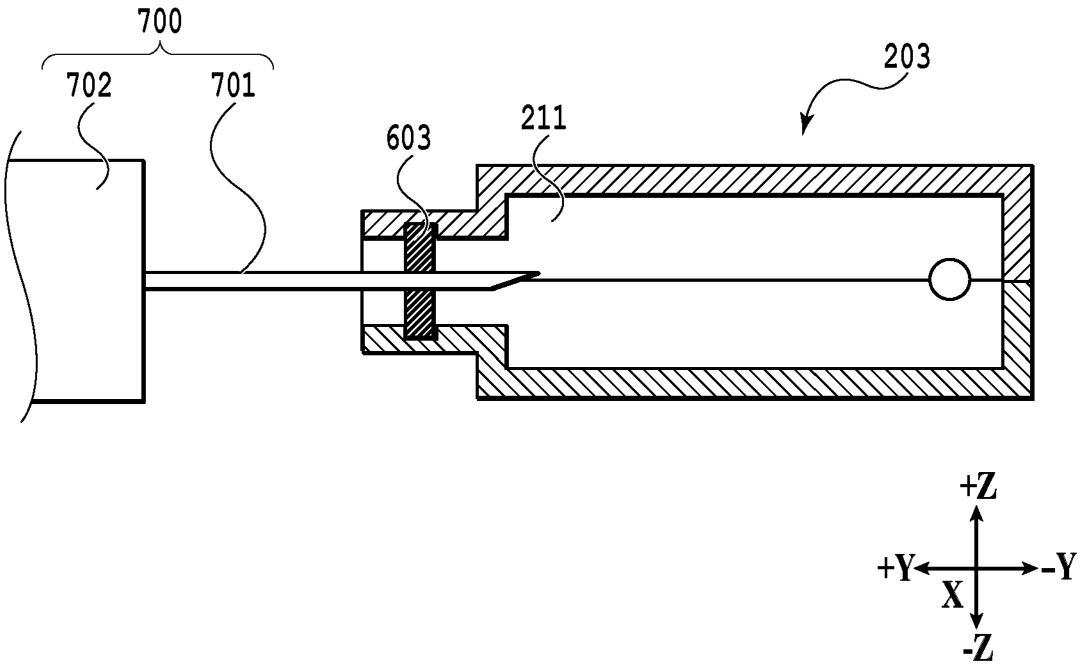
FIG. 7 is a cross-sectional view along line VII-VII of FIG. 6A.

FIG. 7 is a cross-sectional view along line VII-VII in FIG. 6A.

As shown in FIG. 7, the casing of the liquid ejection apparatus includes therein the attaching/detaching section for detachably attaching the liquid storage body. An example of the attaching/detaching section is a hollow needle unit 700 including a hollow needle 701 for connecting a connection section (for example, the connection unit 203) of the liquid storage body. The hollow needle unit 700 includes the hollow needle 701, which can pierce and penetrate the packing 603 provided in the connection unit 203 and a supporting base 702 for supporting the hollow needle 701. As described above, in the present embodiment, four liquid storage bodies can be attached to one liquid ejection apparatus. Accordingly, four hollow needle units 700 are actually provided to connect the respective connection units 203 of these liquid storage bodies. For the sake of explanation, FIG. 7 shows one hollow needle unit 700 and one connection unit 203.

The hollow needle 701 has a distal end (end in the −Y direction in FIG. 7) in which an opening is formed. The inside of the hollow needle 701 is hollow from the opening to a proximal end (end in the +Y direction in FIG. 7). Thus, in a case when the hollow needle 701 penetrates the packing 603 and enters the merge chamber 211, liquid can be supplied from the liquid storage body to the liquid ejection apparatus through the hollow needle 701.

Support of Rotor Plate 207 by Flow Path Members 206

Figure 8:
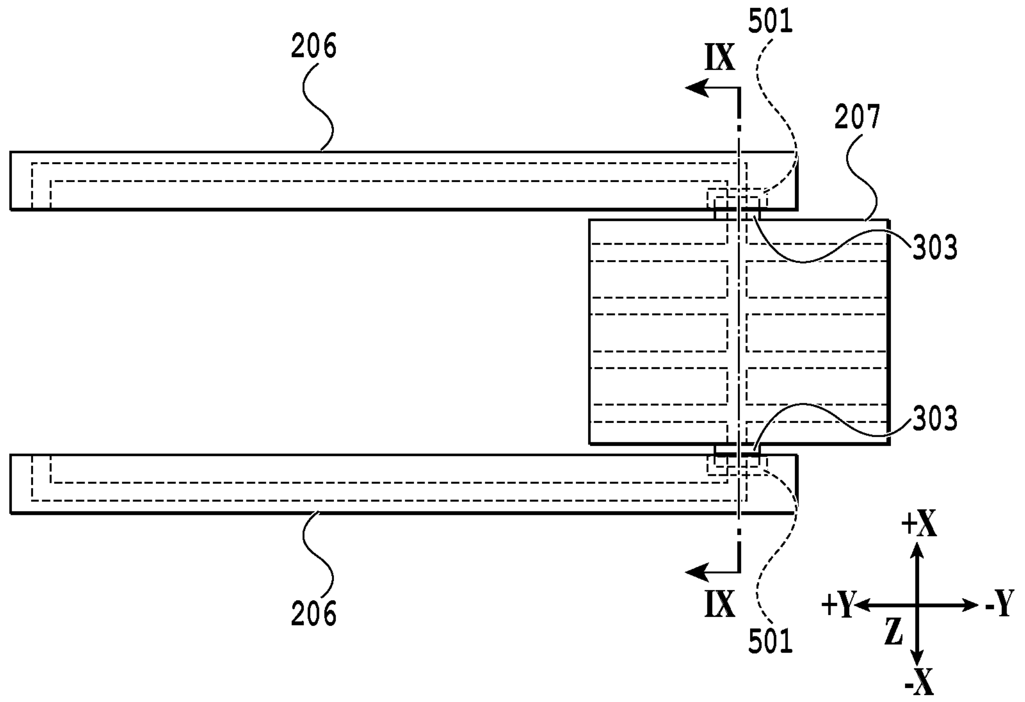
FIG. 8 is a diagram for illustrating support of the rotor plate by the flow path member in an embodiment.

FIG. 8 is a diagram for illustrating support of the rotor plate 207 by the flow path members 206.

As shown in FIG. 8, in the present embodiment, the single rotor plate 207 is rotatably supported by the two flow path members 206. One rotation shaft 303 formed on a first side surface of the rotor plate 207 (for example, the surface oriented in the +X direction) is fit into one first opening 501 formed on a first side surface of the flow path member 206 (for example, the surface oriented in the −X direction). One rotation shaft 303 formed on a second side surface of the rotor plate 207 (for example, the surface oriented in the −X direction) is fit into one first opening 501 formed on a second side surface of the flow path member 206 (for example, the surface oriented in the +X direction).

Figure 9:
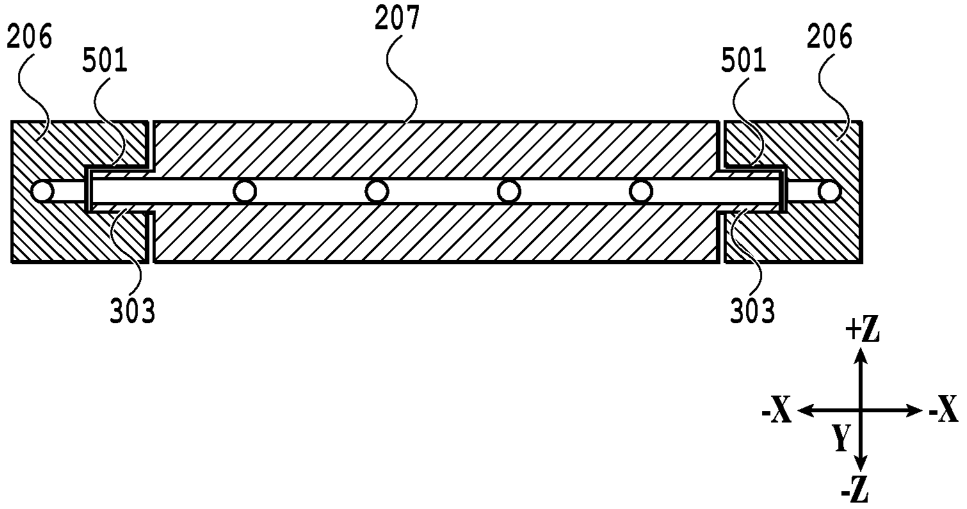
FIG. 9 is a cross-sectional view along line IX-IX of FIG. 8.

FIG. 9 is a cross-sectional view along line IX-IX of FIG. 8.

As shown in FIG. 9, the inside diameter of the first opening 501 is slightly larger than the outside diameter of the rotation shaft 303. Thus, in a case when the two rotation shafts 303 are fit into the respective two first openings 501, a small gap is made between one first opening 501 and one rotation shaft 303. Accordingly, even in a case when the two rotation shafts 303 are fit into the respective two first openings 501, the two rotation shafts 303 are not completely fixed to the respective two first openings 501. That is, in a case when a force is applied to the single rotor plate 207 supported by the two flow path members 206, the rotor plate 207 rotates about the two rotation shafts 303 located on the same axis extending in the X direction. In this manner, the single rotor plate 207 is rotatably supported by the two flow path members 206.

Connection Between Connection Unit 203 and Flow Path Members 206

Figure 10:
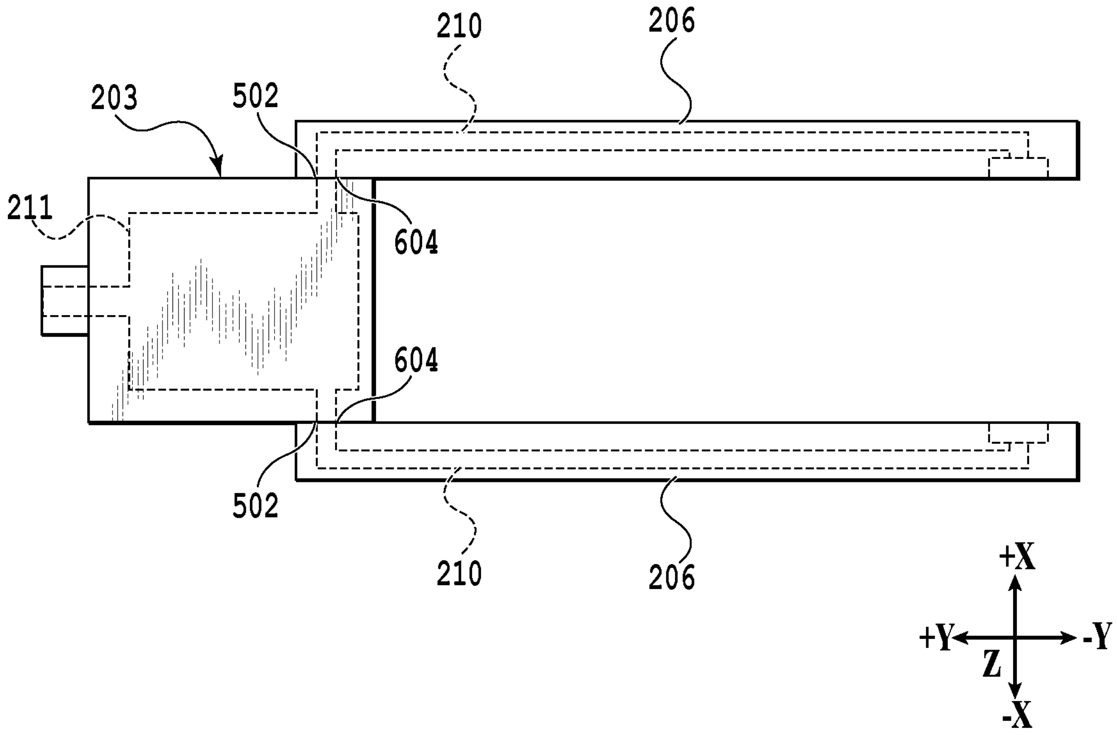
FIG. 10 is a diagram for illustrating connection between the flow path member and the connection unit in an embodiment.

FIG. 10 is a diagram for illustrating connection between the connection unit 203 and the flow path members 206.

As shown in FIG. 10, one end of the side surface of each of the flow path members 206 is fixed to the corresponding side surface of the connection unit 203. The connection unit 203 and the flow path members 206 are connected after being aligned such that one opening 604 is connected to one second opening 502. The connection unit 203 and the flow path members 206 may be connected with an adhesive or by welding as long as the flow path members 206 can be fixed to the connection unit 203.

In the present embodiment, the two flow path members 206 are connected to the single connection unit 203. One end (end in the +Y direction in this example) of a first side surface (surface oriented in the −X direction in this example) of one of the two flow path members 206 is fixed to the first side surface (surface oriented in the +X direction in this example) of the connection unit 203. On the other hand, one end (end in the +Y direction in this example) of a second side surface (surface oriented in the +X direction in this example) of the other of the two flow path members 206 is fixed to the second side surface (surface oriented in the −X direction in this example) of the connection unit 203.

One flow path member 206 is fixed to the first side surface of the connection unit 203 such that one opening 604 and one second opening 502 are connected to each other. One flow path member 206 is fixed to the second side surface of the connection unit 203 such that one opening 604 and one second opening 502 are connected to each other.

According to the above configuration, in a case when the flow path members 206 are fixed to the connection unit 203, the third flow paths 210 are connected to the merge chamber 211. Accordingly, liquid can be supplied from the third flow paths 210 to the merge chamber 211. In this example, liquid can be supplied from the two third flow paths 210 to the single merge chamber 211.

Change of Posture of Rotor Plate 207

Figure 11A:
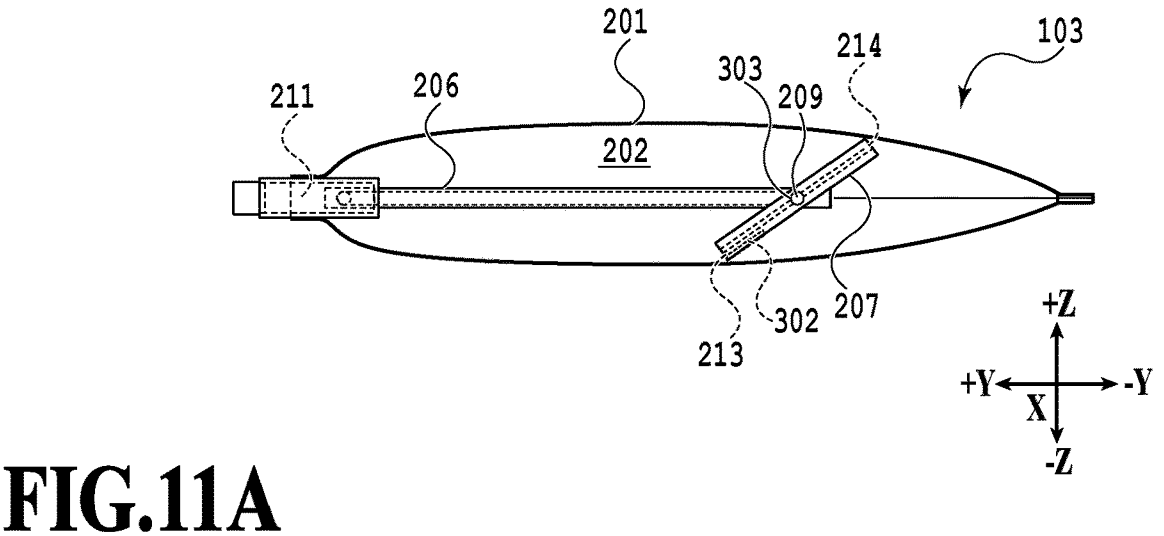
FIG. 11A is a diagram showing a state in which liquid stored in a liquid storage chamber is not consumed.
Figure 11B:
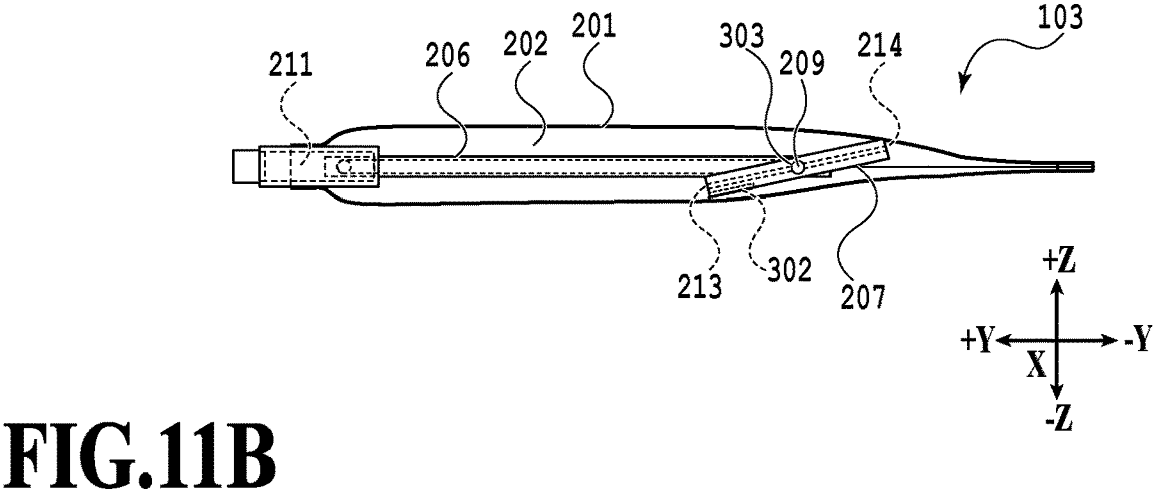
FIG. 11B is a diagram showing a state in which about a half of the liquid stored in the liquid storage chamber shown in FIG. 11A has been consumed.
Figure 11C:
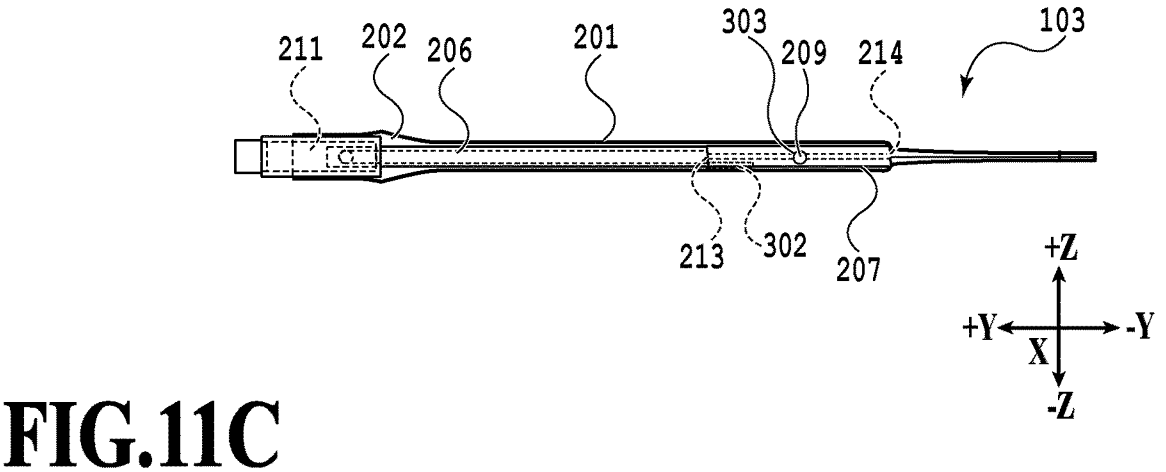
FIG. 11C is a diagram showing a state in which the liquid stored in the liquid storage chamber has been totally consumed.

FIGS. 11A to 11C are diagrams showing a change in height of the bag 201 according to the consumed amount of liquid. FIG. 11A shows a state in which the liquid stored in the liquid storage chamber 202 is not consumed. FIG. 11B is a diagram showing a state in which about a half of the liquid stored in the liquid storage chamber 202 shown in FIG. 11A has been consumed. FIG. 11C is a diagram showing a state in which the liquid stored in the liquid storage chamber 202 has been totally consumed. Incidentally, the posture of the liquid storage body 103 shown in FIGS. 11A to 11C is the attached posture described above.

As shown in FIG. 11A, the height (length in the Z direction) of the bag 201 increases with an increase in amount of liquid stored in the liquid storage chamber 202. As described above, the rotor plate 207 is rotatably supported by the flow path members 206. The weight 302 is provided at one end of the rotor plate 207. That is, the center of gravity of the rotor plate 207 having the weight 302 is located at a position shifted from the second flow path 209, which is formed to penetrate the rotation shafts 303 located in the center of the rotor plate 207 in the longitudinal direction.

Therefore, in a state in which the liquid in the liquid storage chamber 202 is not consumed, the rotor plate 207 receives a force applied by the self-weight of the weight 302 to have a posture (first posture) in which one end is lower than the flow path member 206. As a result, the first intake port 213 is located below the second intake port 214 in the vertical direction (Z direction in this example). At this time, the rotor plate 207 is inclined a relatively-large angle with the flow path members 206 that extend horizontally in the liquid storage chamber 202. Since the rotor plate 207 is thus inclined a relatively-large angle with the horizontally-extending flow path members 206, there arises a relatively-large difference in height between the first intake port 213 formed at one end of the rotor plate 207 and the second intake port 214 formed at the other end of the rotor plate 207.

According to the above configuration, even in a case when there is a difference in pigment density in the liquid stored in the liquid storage chamber 202, liquid relatively high in pigment density is taken in from the first intake port 213 located at the lowermost position (−Z direction) in the example illustrated. On the other hand, liquid relatively low in pigment density is taken in from the second intake port 214 located at the uppermost position (+Z direction) in the example illustrated. Even in such a case when the flows of liquid different in pigment density from each other are taken in from the first intake port 213 and the second intake port 214, the flows of liquid are mixed in the second flow path 209 and the merge chamber 211. According to this configuration, the liquid supplied to the liquid ejection apparatus can have a uniform pigment density.

As shown in FIG. 11B, in a state in which about a half of the liquid stored in the liquid storage chamber 202 has been consumed, the height of the bag 201 is less than the height of the bag 201 in a state in which the liquid stored in the liquid storage chamber 202 is not consumed. An angle formed by the flow path member 206 and the rotor plate 207 in a state in which about a half of the liquid stored in the liquid storage chamber 202 has been consumed is less than the angle formed by the flow path member 206 and the rotor plate 207 in a state in which the liquid stored in the liquid storage chamber 202 is not consumed.

In the process of gradual collapse of the bag 201 due to the consumption of liquid, the bag 201 collapses while pressing the rotor plate 207. In a case when the rotor plate 207 is pressed by the bag 201 collapsing with the consumption of liquid, the rotor plate 207 gradually rotates in line with the deformation of the bag 201 so as not to inhibit the deformation (collapse) of the bag 201. In this example, the rotor plate 207 rotates clockwise.

As a result, the angle formed by the flow path member 206 and the rotor plate 207 decreases with the collapse of the bag 201. The difference in height between the first intake port 213 and the second intake port 214 also gradually decreases with the collapse of the bag 201. The consumption of liquid also gradually reduces the difference in pigment density between the liquid taken in from the first intake port 213 and the liquid taken in from the second intake port 214.

As shown in FIG. 11C, in a state in which the liquid storage body 103 is attached to the liquid ejection apparatus and the liquid in the liquid storage chamber 202 has been totally consumed, the first intake port 213 and the second intake port 214 are at the same position (height) in the vertical direction (Z direction, in this example). The height of the bag 201 in a state in which the liquid stored in the liquid storage chamber 202 has been totally consumed is less than the height of the bag 201 in a state in which about a half of the liquid stored in the liquid storage chamber 202 has been consumed.

As described above, in a state in which the liquid stored in the liquid storage chamber 202 has been totally consumed, no angle is formed by the flow path member 206 and the rotor plate 207. That is, in a state in which the liquid stored in the liquid storage chamber 202 has been totally consumed, the rotor plate 207 is in a posture (second posture) parallel to the flow path member 206.

As a result, there is no difference in height between the first intake port 213 and the second intake port 214 and the bag 201 can be collapsed flatly up to the limit. That is, the rotor plate 207 rotates with the consumption of liquid so as not to inhibit the deformation of the bag 201, with the result that almost the entire liquid stored in the liquid storage chamber 202 can be supplied to the liquid storage chamber 202.

Figure 12:
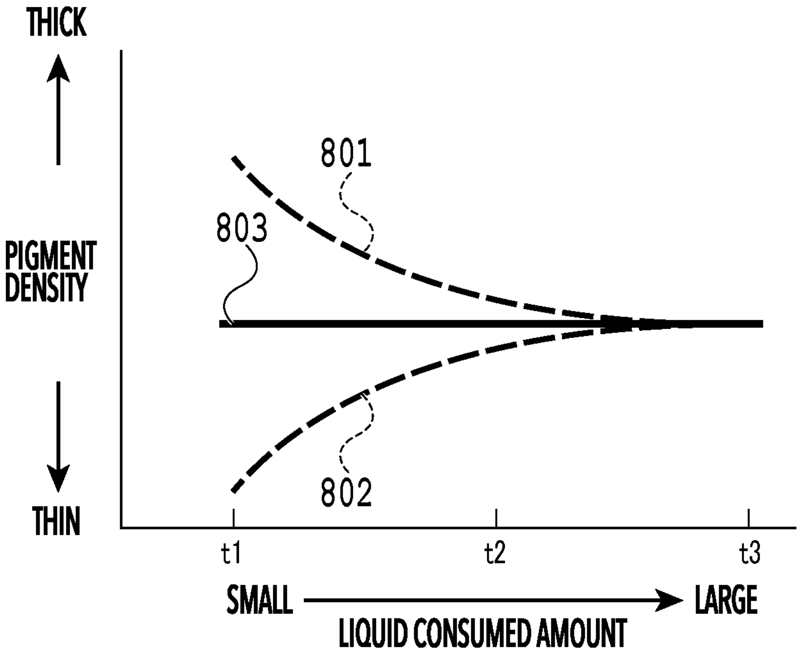
FIG. 12 is a graph showing a relationship between the consumed amount of liquid and the pigment density in liquid in an embodiment.

FIG. 12 is a graph showing the relationship between the consumed amount of liquid and the pigment density of liquid. A first broken line 801 indicates the pigment density of liquid taken in from the first intake port. A second broken line 802 indicates the pigment density of liquid taken in from the second intake port. A solid line 803 indicates the pigment density of liquid in the merge chamber formed in the connection unit.

In FIG. 12, "t1" indicates a point in time at which the liquid stored in the liquid storage chamber is not consumed. That is, the state of the liquid storage body at "t1" corresponds to the state shown in FIG. 11A. "t2" indicates a point in time at which about a half of the liquid stored in the liquid storage chamber is consumed. That is, the state of the liquid storage body at "t2" corresponds to the state shown in FIG. 11B. "t3" indicates a point in time at which the liquid stored in the liquid storage chamber is totally consumed. That is, the state of the liquid storage body at "t3" corresponds to the state shown in FIG. 11C.

As shown by the first broken line 801 and the second broken line 802, a difference between the density of pigment contained in the liquid taken in from the first intake port and the density of pigment contained in the liquid taken in from the second intake port is greatest at "t1." The difference in pigment density at "t2" is less than the difference in pigment density at "t1." The difference in pigment density at "t3" is less than the difference in pigment density at "t2."

On the other hand, as shown by the solid line 803, the pigment density of liquid in the merge chamber is intermediate between the pigment density of liquid taken in from the first intake port and the pigment density of liquid taken in from the second intake port, irrespective of the consumed amount of liquid (liquid consumed amount). That is, the liquid taken in from the first intake port and the liquid taken in from the second intake port are mixed in a ratio of about 50:50. In this manner, the pigment density of liquid is stable in the merge chamber, irrespective of the consumed amount of liquid. Therefore, according to the liquid storage body of the present embodiment, the liquid ejection apparatus can be supplied with liquid uniform in pigment density regardless of whether the consumed amount of liquid is large or small.

As described above, in the liquid storage body of the present embodiment, in a case when the bag is deformed due to the consumption of liquid, the rotor plate gradually rotates to become close to the state of being parallel to the flow path member extending horizontally in the liquid storage chamber. Accordingly, the bag can be smoothly made flat depending on the consumed amount of liquid. That is, in the liquid storage body of the present embodiment, the deformation of the bag is not inhibited by a spacer member, unlike that discussed in Japanese Patent Laid-Open No. 2018-65373.

Further, by the rotation of the rotor plate, a difference in height between the first intake port for taking in liquid relatively high in pigment density and the second intake port for taking in liquid relatively low in pigment density is made suitable, irrespective of the consumed amount of liquid. Thus, even in a case when there is a difference in pigment density in the liquid storage chamber, the liquid ejection apparatus can be supplied with liquid uniform in pigment density.

Therefore, according to the liquid storage body of this disclosure, the density of the settleable component contained in the liquid can be maintained suitably and the ability to use up the liquid can be improved. Incidentally, although the rotor plate rotates until it becomes parallel to the flow path member in the present embodiment, the ability to use up the liquid can be improved even by a slight rotation of the rotor plate compared with the liquid storage body as disclosed in Japanese Patent Laid-Open No. 2018-65373.

Second Embodiment

A second embodiment in the technique of this disclosure will be described below with reference to the drawing. A difference between the rotor plate of the first embodiment and the rotor plate of the present embodiment is a formation pattern of flow paths. The difference will be mainly described below while features identical to or corresponding to those of the first embodiment are denoted by the same reference numerals and description thereof is omitted.

Figure 13:
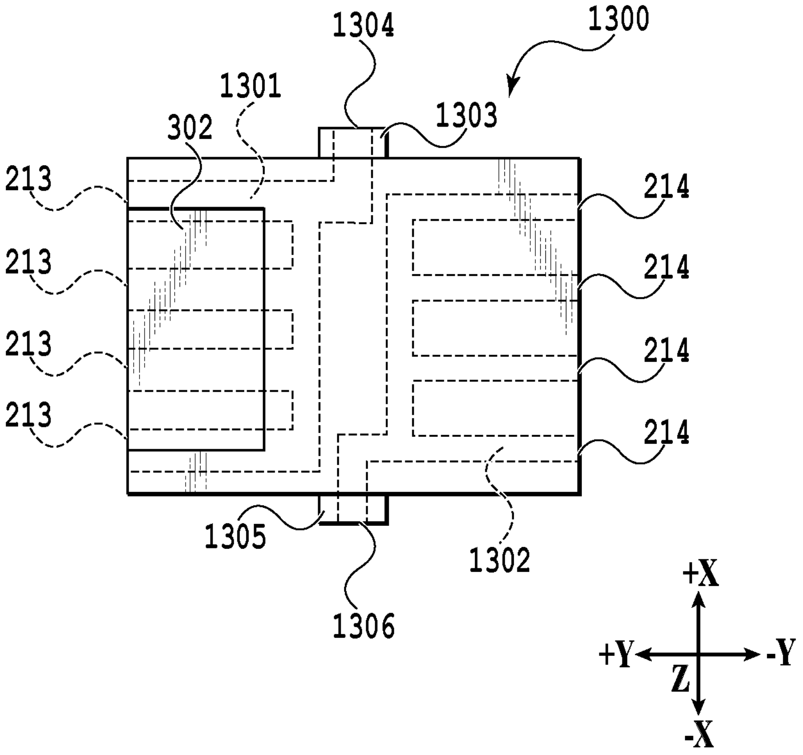
FIG. 13 is a transparent plan view showing an example of the rotor plate in an embodiment.

FIG. 13 is a plan view showing an example of a second rotor plate 1300 usable in the present embodiment. In FIG. 13, flow paths formed in the second rotor plate 1300 are shown by broken lines.

A second liquid storage body (not shown) of the present embodiment also comprises two flow path members (not shown). For the sake of explanation, one of these two flow path members is referred to as a first flow path member and the other as a second flow path member. One end of the second rotor plate 1300 is provided with a weight 302.

In the present embodiment, a flow path for guiding liquid from the first intake port 213 to the merge chamber (not shown) in the connection unit and a flow path for guiding liquid from the second intake port 214 to the merge chamber in the connection unit are formed independently of each other.

As shown in FIG. 13, the second rotor plate 1300 has a flow path 1301 that connects the first intake port 213 formed in the front surface to an opening 1304 formed in a rotation shaft 1303 formed on the right side surface. Liquid taken in from the first intake port 213 is supplied to the first flow path member through the opening 1304. The second rotor plate 1300 also has a flow path 1302 that connects the second intake port 214 formed in the back surface to an opening 1306 formed in a rotation shaft 1305 formed on the left side surface. Liquid taken in from the second intake port 214 is supplied to the second flow path member through the opening 1306.

In this example, the flow path 1301 is formed continuously from four first intake ports 213 to one opening 1304. The flow path 1302 is formed continuously from four second intake ports 214 to one opening 1306. An inside diameter of the first intake port 213 is greater than that of the second intake port 214. An inside diameter of the flow path 1301 is greater than an inside diameter of the flow path 1302.

According to the above configuration, liquid relatively high in pigment density and difficult to take in can be taken in from the first intake port 213 having the large inside diameter and supplied to the first flow path member. On the other hand, liquid relatively low in pigment density and easy to take in can be taken in from the second intake port 214 having the small inside diameter and supplied to the second flow path member. Accordingly, the liquid can be supplied to the liquid ejection apparatus after the pigment density of liquid is made uniform in the merge chamber of the connection unit. Incidentally, the number of first intake ports 213 may be greater than the number of second intake ports 214. In a case when the number of first intake ports 213 is greater than the number of second intake ports 214, the flow path 1301 and the flow path 1302 may have the same inside diameter.

As described above, even in a case when the flows of liquid are not merged inside the second rotor plate 1300, the ability to use up the liquid can be improved while supplying the liquid stable in pigment density. Incidentally, the scope of this disclosure includes appropriately adjusting the numbers and/or diameters of flow paths for taking in liquid relatively high in pigment density and flow paths for taking in liquid relatively low in pigment density in consideration of the final pigment density of liquid to be supplied to the liquid ejection apparatus.

Third Embodiment

A third embodiment in the technique of this disclosure will be described below with reference to the drawings. A difference between the liquid storage bodies of the first and second embodiments and the liquid storage body of the present embodiment is that the rotor plate is rotatably supported by a single flow path member. The difference will be mainly described below while features identical to those of the first and second embodiments are denoted by the same reference numerals and description thereof is omitted.

Figure 14A:
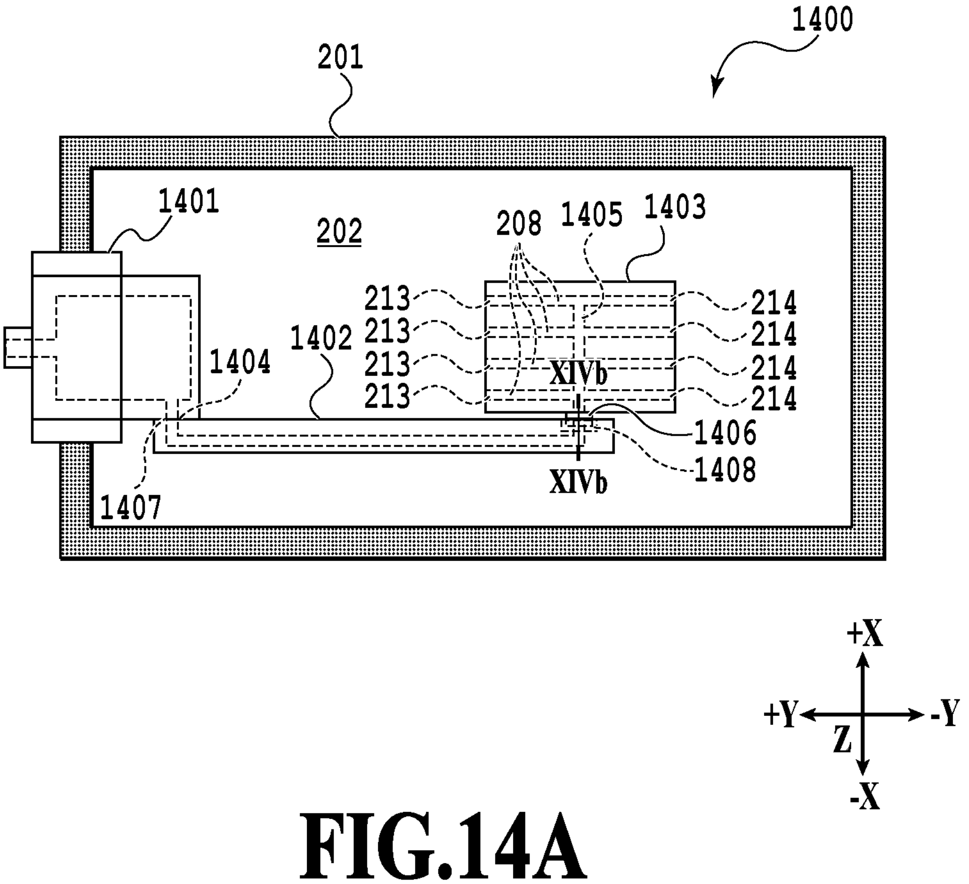
FIG. 14A is a transparent plan view showing an example of a third liquid storage body usable in the embodiment.
Figure 14B:
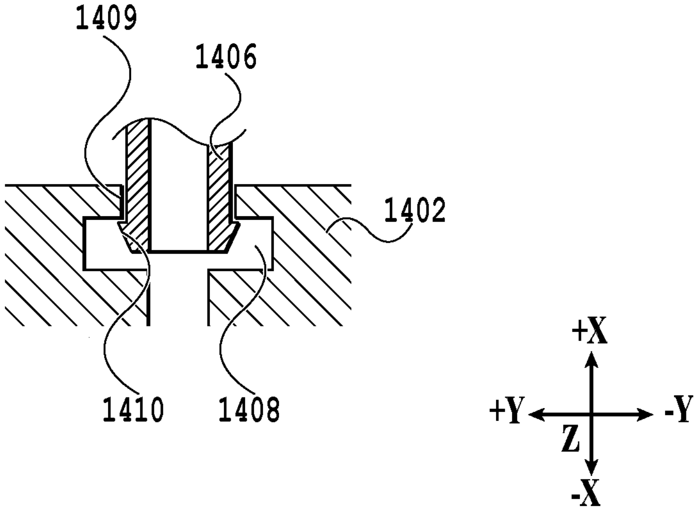
FIG. 14B is a cross-sectional view along line XIV-XIV of FIG. 14A.

FIGS. 14A and 14B are diagrams illustrating a third liquid storage body 1400 usable in the present embodiment. FIG. 14A is a transparent top view showing an example of the third liquid storage body 1400 usable in the present embodiment. FIG. 14B is a cross-sectional view along line XIV-XIV of FIG. 14A.

As shown in FIG. 14A, the third liquid storage body 1400 comprises a connection unit 1401, a single flow path member 1402, and a third rotor plate 1403. One opening 1404 is formed in one of two side surfaces of the connection unit 1401 (left side surface oriented in the −X direction). No opening is formed in the other of the two side surfaces of the connection unit 1401 (right side surface oriented in the +X direction).

The third rotor plate 1403 has the first intake port 213, the second intake port 214, and the first flow path 208. The third rotor plate 1403 has a flow path 1405 for merging liquid taken in from the first intake port 213 with liquid taken in from the second intake port 214. The flow path 1405 is formed to intersect the first flow path 208 but does not penetrate the third rotor plate 1403 in the transverse direction (X direction). One rotation shaft 1406 is formed on one of two side surfaces of the third rotor plate 1403 (surface oriented in the −X direction in this example). No rotation shaft is formed on the other of the two side surfaces of the third rotor plate 1403 (right side surface oriented in the +X direction in this example).

A side surface of the flow path member 1402 (surface oriented in the +X direction in this example) has an opening 1407 connectable to the opening 1404 and a fitting section 1408 into which the rotation shaft 1406 of the third rotor plate 1403 is fit.

The single flow path member 1402 is fixed to the connection unit 1401. The single flow path member 1402 is fixed to the single connection unit 1401 so that the single opening 1404 and the single opening 1407 are connected to each other.

In the present embodiment, the flow path member 1402 supports the third rotor plate 1403 so that the rotation shaft 1406 is hard to remove from the fitting section 1408. As described above, in the present embodiment, the single flow path member 1402 is provided along the side surface (surface oriented in the −X direction in this example) of the third rotor plate 1403. However, the single flow path member 1402 may be provided along the surface of the third rotor plate 1403 oriented in the +X direction.

As shown in FIG. 14B, the flow path member 1402 has the fitting section 1408 into which the rotation shaft 1406 is fit to thereby enable rotatable support. The fitting section 1408 includes an opening 1409 into which the rotation shaft 1406 can be press-fit.

On the other hand, the rotation shaft 1406 has an engaging section 1410 that can be engaged with the recess of the opening 1409. The engaging section 1410 is shaped such that a diameter gradually decreases from the end on the +X direction side toward the end on the −X direction side. The outside diameter of the end of the engaging section 1410 on the −X direction side is less than the inside diameter of the opening 1409. The outside diameter of the end of the engaging section 1410 on the +X direction side is greater than the inside diameter of the opening 1409. The width (length in the X direction) of the engaging section 1410 is less than the width (length in the X direction) of the fitting section 1408. Accordingly, in a case when the rotation shaft 1406 is press-fit into the fitting section 1408 by a certain force, the end of the engaging section 1410 on the +X direction side is engaged with the recess of the opening 1409.

As described above, in the present embodiment, the flow path member 1402 supports the third rotor plate 1403 so that the rotation shaft 1406 is hard to remove from the fitting section 1408. According to this configuration, since the number of flow path members is less than that in the first and second embodiments, the bag 201 (see FIG. 14A) can be made flatter than that in the first and second embodiments. In other words, the amount of liquid left behind in the liquid storage chamber 202 (see FIG. 14A) can be further reduced.

Therefore, according to the third liquid storage body 1400, the ability to use up the liquid can be further improved as compared with the first and second embodiments.

Fourth Embodiment

A fourth embodiment in the technique of this disclosure will be described below with reference to the drawing. A difference between the liquid storage bodies of the first, second, and third embodiments and the liquid storage body of the present embodiment is the shape of the bag. The difference will be mainly described below while features identical to those of the first, second, and third embodiments are denoted by the same reference numerals and a description thereof is omitted.

Figure 15:
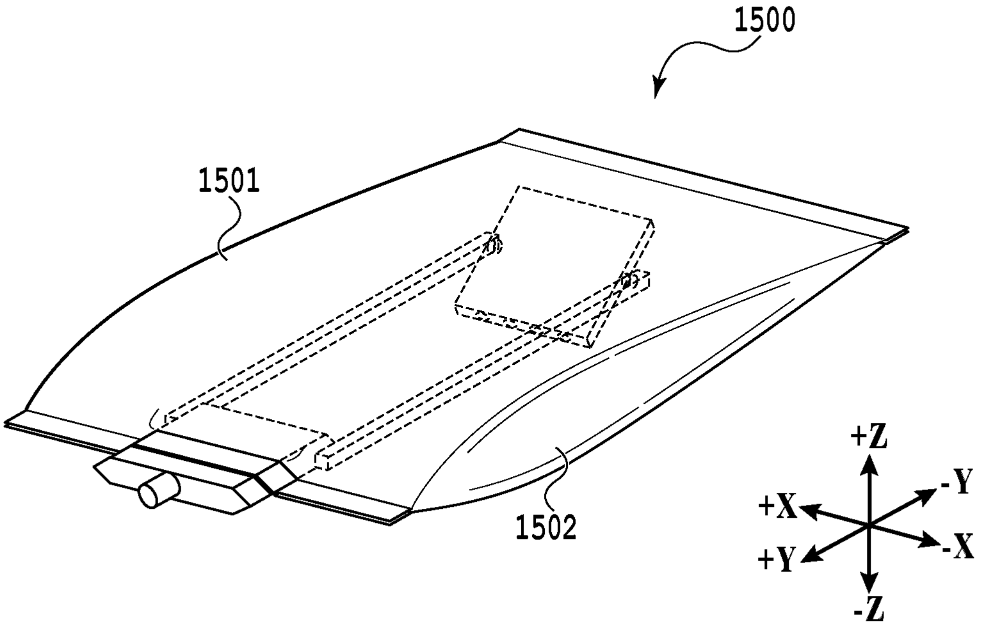
FIG. 15 is an external perspective view showing an example of a liquid storage body in an embodiment.

FIG. 15 is a diagram illustrating a fourth liquid storage body 1500 usable in the present embodiment.

As shown in FIG. 15, a gusset 1502 is formed on the side wall of the bag 1501 of the fourth liquid storage body 1500. Even in the case of using such a bag 1501 of a type called a gusset bag, the same advantageous result as the first, second, and third embodiments can be produced.

Fifth Embodiment

Figure 16:
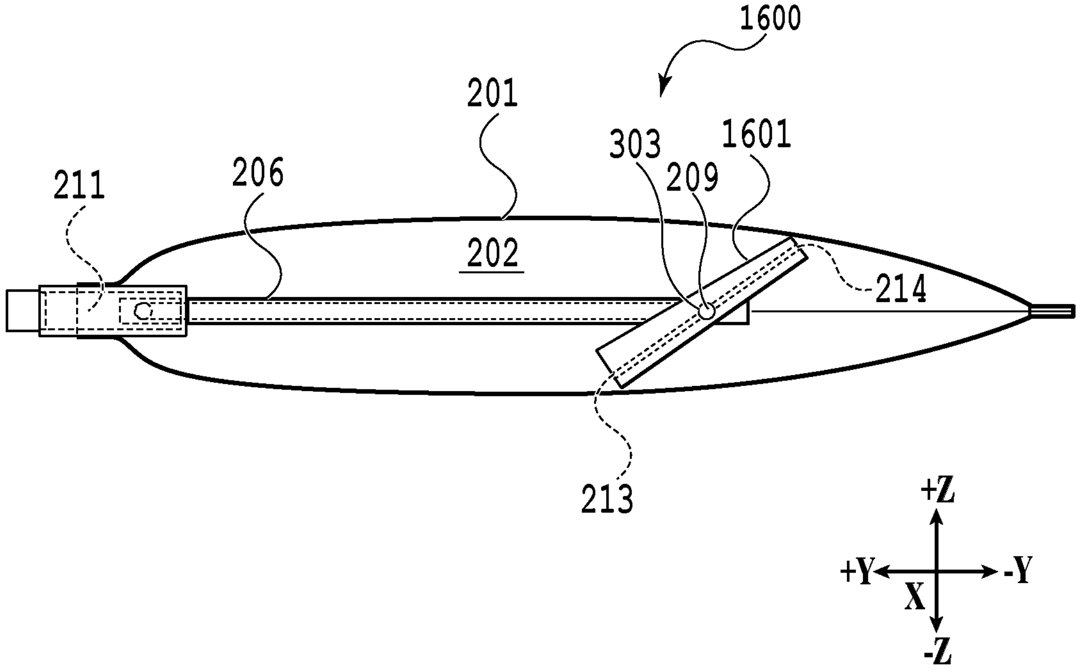
FIG. 16 is a transparent side view showing an example of a liquid storage body in an embodiment.

FIG. 16 is a diagram illustrating a liquid storage body usable in the present embodiment. A difference between the liquid storage bodies of the first, second, third, and fourth embodiments and the liquid storage body of the present embodiment is the thickness of the rotor plate. The difference will be mainly described below while features identical to those of the first, second, third, and fourth embodiments are denoted by the same reference numerals and description thereof is omitted.

As shown in FIG. 16, one end (end on the −Y direction side) and the other end (end on the +Y direction side) of a fifth rotor plate 1601 of a fifth liquid storage body 1600 of the present embodiment are different in thickness from each other. The fifth rotor plate 1601 is configured such that its thickness gradually increases from the one end toward the other end. In this example, the thickness of the surface in which the first intake port 213 is formed is greater than the thickness of the surface in which the second intake port 214 is formed. The thickness of the fifth rotor plate 1601 may vary not continuously, but in stages. Incidentally, the fifth rotor plate 1601 may be configured such that its thickness increases from the end on the +Y direction side toward the end on the −Y direction side. In a case when the fifth rotor plate 1601 is configured such that its thickness increases from the end on the +Y direction side toward the end on the −Y direction side, the inclination of the fifth rotor plate 1601 is reversed from the example illustrated.

According to the above configuration, the center of gravity of the fifth rotor plate 1601 can be located between the rotation shaft 303 and one end of the fifth rotor plate 1601 without the weight as shown in the first embodiment. Therefore, even with this configuration, the fifth rotor plate 1601 can be inclined in advance in a state in which liquid is not consumed. In addition, since the weight is not comprised, a manufacturing cost can be reduced as compared with the rotor plate comprising the weight.

Sixth Embodiment

Figure 17:
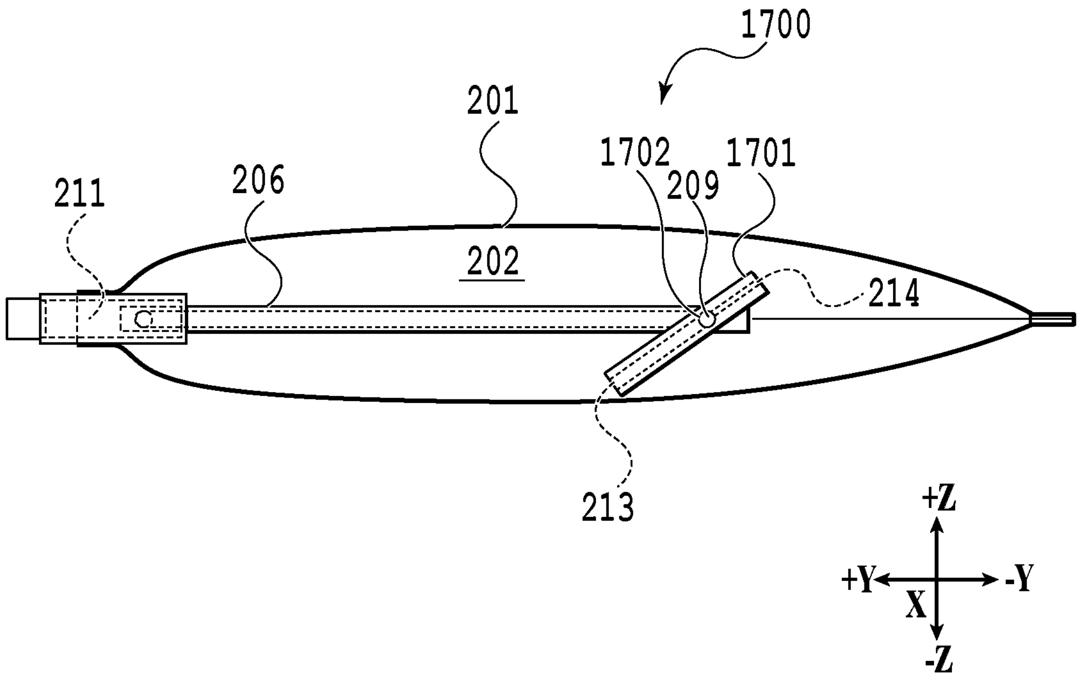
FIG. 17 is a transparent side view showing an example of a liquid storage body in an embodiment.

FIG. 17 is a diagram illustrating a liquid storage body usable in the present embodiment. A difference between the liquid storage bodies of the first, second, third, fourth, and fifth embodiments and the liquid storage body of the present embodiment is the position of the rotation shaft. The difference will be mainly described below while features identical to those of the first, second, third, fourth, and fifth embodiments are denoted by the same reference numerals and description thereof is omitted.

As shown in FIG. 17, a sixth liquid storage body 1700 in the present embodiment comprises a sixth rotor plate 1701. The sixth rotor plate 1701 comprises a rotation shaft 1702 formed at a position shifted from the center toward the end in the longitudinal direction. In other words, the rotation shaft 1702 is not formed in the center of the sixth rotor plate 1701 in the longitudinal direction (Y direction). Accordingly, in the present embodiment, the second flow path 209 is not formed in the center of the sixth rotor plate 1701 in the longitudinal direction (Y direction), either.

Also, in the present embodiment, liquid taken in from the first intake port 213 and liquid taken in from the second intake port 214 are merged in the second flow path 209. In the present embodiment, however, a flow path formed between the first intake port 213 and the second flow path 209 (that is, a merge section for liquid high in pigment density and liquid low in pigment density) is greater in length and diameter than a flow path formed between the second intake port 214 and the second flow path 209.

According to the above configuration, the center of gravity of the sixth rotor plate 1701 can be located between the rotation shaft 1702 and one end of the sixth rotor plate 1701 without the weight as shown in the first embodiment. Therefore, even with this configuration, the sixth rotor plate 1701 can be inclined in advance in a state in which liquid is not consumed.

In this example, however, since the flow path having the first intake port 213 for taking in liquid relatively high in pigment density and the flow path having the second intake port 214 for taking in liquid relatively low in pigment density have different lengths, these flow paths also have different flow resistances. In this example, the flow path having the first intake port 213 is longer than the flow path having the second intake port 214. Accordingly, a balance of pigment density of liquid taken into the sixth rotor plate 1701 may deviate from a desired balance.

In the present embodiment, the diameter of the flow path on the first intake port 213 side is greater than the diameter of the flow path on the second intake port 214 side. A desired balance can be achieved by thus adjusting the flow resistances of the flows of liquid taken in from the first intake port 213 and the second intake port 214.

Therefore, even with the above configuration, the ability to use up the liquid can be improved while supplying the liquid stable in pigment density. In addition, since the weight is not comprised, a manufacturing cost can be reduced as compared with the rotor plate comprising the weight.

Other Embodiments

The liquid ejection apparatus 100 is a serial type inkjet printer in which a liquid ejection head moves reciprocally in the example of FIG. 1, but may be a line type inkjet printer in which a liquid ejection head does not move reciprocally. Further, for example, the liquid ejection apparatus 100 may be a single-function printer having only the recording function or may be a multi-function printer having multiple functions such as recording, facsimile, and scanner functions.

FIG. 2A shows an example of the pillow-type bag and FIG. 15 shows an example of the bag called a gusset bag. However, the bag is not limited to these examples. For example, the bag may be obtained by forming a single sheet into a cylindrical shape and welding an end of the sheet.

In the embodiments described above, the number of first flow paths 208 is four and their diameter is 1 mm. However, the number and diameter of first flow paths 208 may be changed as appropriate depending on the amount and/or viscosity of intake liquid.

The first flow path 208 may have different diameters on opposite sides of the second flow path 209 in the Y direction. This configuration enables adjustment of the amount of intake liquid.

In the example shown in FIG. 11A to FIG. 11C, the weight 302 is provided on the lower surface of the rotor plate 207. However, the weight 302 may be provided on the upper surface of the rotor plate 207. This configuration can also improve the ability to use up the liquid while supplying the liquid uniform in pigment density.

The weight 302 is provided on the +Y direction side of the rotor plate 207, but may be provided on the −Y direction side. In a case when the weight 302 is provided on the −Y direction side of the rotor plate 207, the inclination of the rotor plate 207 is reversed from the example shown in FIG. 11A and FIG. 11B. That is, in a case when the weight 302 is provided on the −Y direction side of the rotor plate 207, liquid relatively low in pigment density is taken in from the first intake port 213 and liquid relatively high in pigment density is taken in from the second intake port 214. This configuration can also improve the ability to use up the liquid while supplying the liquid uniform in pigment density.

According to the liquid storage body of this disclosure, the density of the settleable component contained in the liquid can be suitably maintained and the ability to use up liquid can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A liquid storage body for supplying liquid to a liquid ejection apparatus, the liquid storage body comprising:
- a bag configured to store liquid containing a settleable component;
- a connection section configured to supply liquid stored in the bag to the liquid ejection apparatus through a supply port, while being attached to the liquid ejection apparatus;
- a flow path section provided inside the bag and configured to supply liquid to the connection section; and
- an intake section provided inside the bag and configured to take in liquid stored in the bag and to supply the liquid to the flow path section, wherein the intake section comprises a first intake port and a second intake port to take in liquid, the intake section is supported by the flow path section so as to rotate with the consumption of liquid stored inside the bag, and the first intake port and the second intake port are formed to face each other with a flow path therebetween, the flow path being formed in a direction in which a rotational axis extends in a case when the intake section rotates.

2. The liquid storage body according to claim 1, wherein, in a state in which the liquid storage body is attached to the liquid ejection apparatus and liquid in the bag is not consumed, the first intake port is located below the second intake port in a vertical direction.

3. The liquid storage body according to claim 1, wherein, in a state in which the liquid storage body is attached to the liquid ejection apparatus and liquid in the bag has been consumed, the first intake port and the second intake port are in a same position in a vertical direction.

4. The liquid storage body according to claim 1, wherein a center of gravity of the intake section is at a position deviated from the flow path.

5. The liquid storage body according to claim 4, wherein the intake section comprises a weight.

6. The liquid storage body according to claim 4, wherein a thickness of a surface in which the first intake port is formed is greater than a thickness of a surface in which the second intake port is formed.

7. The liquid storage body according to claim 1, wherein the intake section comprises a first flow path for guiding liquid taken in from the first intake port, a second flow path for guiding liquid taken in from the second intake port, and a merge section for merging the liquid from the first flow path with the liquid from the second flow path.

8. The liquid storage body according to claim 7, wherein the first flow path is greater in length and inside diameter than the second flow path.

9. The liquid storage body according to claim 1, wherein the flow path section comprises a first flow path member and a second flow path member that are provided to sandwich the intake section, the first flow path member guides liquid taken in from the first intake port to a merge chamber of the connection section, and the second flow path member guides liquid taken in from the second intake port to the merge chamber.

10. The liquid storage body according to claim 1, wherein the flow path section is a single flow path member provided along a side surface of the intake section.

11. The liquid storage body according to claim 1, wherein a rigidity of the intake section is greater than a rigidity of the bag.

12. The liquid storage body according to claim 1, wherein the settleable component is a pigment.

13. A liquid ejection apparatus comprising:

a liquid storage body;

an attaching/detaching section to which the liquid storage body is attachable and from which the liquid storage body is detachable; and a liquid ejection head configured to eject liquid supplied from the liquid storage body attached to the attaching/detaching section, wherein the liquid storage body comprises:

a bag configured to store liquid containing a settleable component; and a connection section configured to supply liquid stored in the bag to the liquid ejection apparatus through a supply port, while being attached to the liquid ejection apparatus;

a flow path section provided inside the bag and configured to supply liquid to the connection section; and an intake section provided inside the bag and configured to take in liquid stored in the bag and to supply the liquid to the flow path section, wherein the intake section comprises a first intake port and a second intake port to take in liquid, the intake section is supported by the flow path section so as to rotate with the consumption of liquid stored inside the bag, and the first intake port and the second intake port are formed to face each other with a flow path therebetween, the flow path being formed in a direction in which a rotational axis extends in a case when the intake section rotates.

14. The liquid ejection apparatus according to claim 13, wherein, in a state in which the liquid storage body is attached to the liquid ejection apparatus and liquid in the bag is not consumed, the first intake port is located below the second intake port in a vertical direction.

15. The liquid ejection apparatus according to claim 13, wherein, in a state in which the liquid storage body is attached to the liquid ejection apparatus and liquid in the bag has been consumed, the first intake port and the second intake port are in a same position in a vertical direction.

16. The liquid ejection apparatus according to claim 13, wherein the intake section comprises a first flow path for guiding liquid taken in from the first intake port, a second flow path for guiding liquid taken in from the second intake port, and a merge section for merging the liquid from the first flow path with the liquid from the second flow path.

17. The liquid ejection apparatus according to claim 13, wherein the flow path section comprises a first flow path member and a second flow path member that are provided to sandwich the intake section, the first flow path member guides liquid taken in from the first intake port to a merge chamber of the connection section, and the second flow path member guides liquid taken in from the second intake port to the merge chamber.

18. A liquid ejection apparatus comprising:

a liquid storage body;

an attaching/detaching section to which the liquid storage body is attachable and from which the liquid storage body is detachable; and a liquid ejection head configured to eject liquid supplied from the liquid storage body attached to the attaching/detaching section, wherein the liquid storage body comprises:

a bag configured to store liquid; and a connection section configured to supply liquid stored in the bag to the liquid ejection apparatus through a supply port, while being attached to the liquid ejection apparatus;

a flow path section provided inside the bag and configured to supply liquid to the connection section; and an intake section provided inside the bag and configured to take in liquid stored in the bag and to supply the liquid to the flow path section, wherein the intake section comprises a first intake port and a second intake port to take in liquid, the intake section is supported by the flow path section so as to rotate with the consumption of liquid stored inside the bag, and the first intake port and the second intake port are formed to face each other with a flow path therebetween, the flow path being formed in a direction in which a rotational axis extends in a case when the intake section rotates.

19. The liquid ejection apparatus according to claim 18, wherein, in a state in which the liquid storage body is attached to the liquid ejection apparatus and liquid in the bag is not consumed, the first intake port is located below the second intake port in a vertical direction.

20. The liquid ejection apparatus according to claim 18, wherein, in a state in which the liquid storage body is attached to the liquid ejection apparatus and liquid in the bag has been consumed, the first intake port and the second intake port are in a same position in a vertical direction.

* * * * *